United States Patent
Li et al.

(10) Patent No.: US 12,088,097 B2
(45) Date of Patent: Sep. 10, 2024

(54) APPARATUS AND METHOD FOR PARAMETER COMPREHENSIVE MONITORING AND TROUBLESHOOTING OF POWER TRANSFORMATION AND DISTRIBUTION

(71) Applicant: Huangshan University, Huangshan (CN)

(72) Inventors: Zheng Li, Huangshan (CN); Jiuzhang He, Huangshan (CN); Kun Zhang, Huangshan (CN); Taiming Sun, Huangshan (CN); Yunyan Zhou, Huangshan (CN); Wei Hu, Huangshan (CN); Sheng Qian, Huangshan (CN)

( * ) Notice: Subject to any disclaimer, the term of this patent is extended or adjusted under 35 U.S.C. 154(b) by 276 days.

(21) Appl. No.: 17/730,580

(22) Filed: Apr. 27, 2022

(65) Prior Publication Data

US 2022/0344932 A1 Oct. 27, 2022

Related U.S. Application Data

(63) Continuation of application No. PCT/CN2022/086529, filed on Apr. 13, 2022.

(30) Foreign Application Priority Data

Apr. 21, 2021 (CN) .......................... 202110430337.6

(51) Int. Cl.
*H02J 3/00* (2006.01)
*G05B 19/042* (2006.01)
*G08B 21/18* (2006.01)
*G16Y 40/20* (2020.01)
*H02J 9/06* (2006.01)

(52) U.S. Cl.
CPC ............ *H02J 3/001* (2020.01); *G05B 19/042* (2013.01); *G08B 21/18* (2013.01); *H02J 9/06* (2013.01); *G05B 2219/2639* (2013.01); *G16Y 40/20* (2020.01)

(58) Field of Classification Search
CPC .......... H02J 3/001; H02J 9/06; G05B 19/042; G05B 2219/2639; G08B 21/18; G16Y 40/20
See application file for complete search history.

(56) References Cited

U.S. PATENT DOCUMENTS

2018/0128862 A1* 5/2018 Satoh .................... G06Q 10/06

* cited by examiner

*Primary Examiner* — Carlos Amaya

(57) ABSTRACT

An apparatus and method for parameter comprehensive monitoring and troubleshooting of power transformation and distribution are disclosed. The apparatus includes a data acquisition unit, an on-site CPU, a main CPU, an operation and maintenance control center, a UPS and an energy storage breaking mechanism. Each on-site CPU compares the relevant state values of equipment line collected by a data acquisition unit with a threshold set by fiber Bragg grating sensor nodes and sums up to a main CPU. The main CPU stores and display the relevant state values through a display screen. The node represents each distribution point. A link represents a data transmission path. An attached table displays all state parameters. A working state of the distribution equipment is determined according to a color of the node and the link.

9 Claims, 3 Drawing Sheets

APPARATUS AND METHOD FOR PARAMETER COMPREHENSIVE MONITORING AND TROUBLESHOOTING OF POWER TRANSFORMATION AND DISTRIBUTION

CROSS REFERENCE TO RELATED APPLICATION

This patent application is a continuation application of PCT/CN2022/086529, filed on Apr. 13, 2022, which claims the benefit and priority of Chinese Patent Application No. 202110430337.6, filed on Apr. 21, 2021, the disclosure of which is incorporated by reference herein in its entirety as part of the present application.

TECHNICAL FIELD

The present disclosure relates to the technical field of power distribution environment monitoring, and more specifically, to an apparatus and method for parameter comprehensive monitoring and troubleshooting of power transformation and distribution.

BACKGROUND ART

In recent years, with the continuous development of the cable process of distribution network, the line structure of distribution network is becoming more and more complex, and there are many branch lines. At the same time, the requirements for the stability and reliability of power distribution places are higher and higher. At present, various sensing devices have been installed in the power distribution place, and the sensing data are uploaded to the twin power distribution room or shadow power distribution room through the Internet of Things, 5G and other technologies, and then controlled by the on-duty management personnel.

After searching, the patent application No. 201610783123.6 discloses a method for monitoring operation environment of distribution equipment, which is realized by using the operation environment monitoring device of distribution equipment. The device includes a radiation transmitter, a radiation receiver, a microprocessor, an induced current measurement unit, a vibration sensor and a temperature and humidity measurement sensor. The microprocessor is respectively connected with the radiation measurement unit, the induced current measurement unit, the vibration sensor and the temperature and humidity measurement sensor. It has multiple styles, and can measure the environmental parameters of the distribution network and effectively determine the abnormality of the distribution network.

The working mode of the above device for environmental monitoring of power distribution places is to monitor, collect, transmit and display data. Although the relevant parameters can be found and recorded, there are still some deficiencies. First, the monitoring data generated by the monitoring equipment of the above device and the data of the sensing equipment of the monitored equipment are not compared and verified with each other, which is prone to false positives and false positives. Second, the monitoring equipment of the above devices are not connected into a system for linkage, resulting in independent data and insufficient utilization of resources. Therefore, it is impossible to determine the dangerous situation process of the distribution environment, and can not take the initiative to deal with the special time or dangerous situation stage in time. It can only protect the equipment afterwards, resulting in poor reliability. Third, the monitoring equipment of the above device is realized by discrete sensors with different principles, which has the disadvantages of low integration, cumbersome installation, troublesome maintenance and inconsistent accuracy, so it is difficult to meet the requirements of comprehensive use of power distribution.

SUMMARY

The purposes of the disclosure are as follows. Firstly, in order to solve the problem that the process of dangerous situation cannot be identified in the prior art, so that it can not make timely and active response to special time or fault stage, an apparatus and method for parameter comprehensive monitoring and troubleshooting of power transformation and distribution are proposed. Secondly, in order to solve the problems of different principles of discrete sensors and inconsistent accuracy standards, it is proposed to adopt fiber Bragg grating sensors and layout scheme for the parameters in the distribution cabinet. Thirdly, in order to solve the problem of power resource sharing among distribution rooms, the power resource dispatching scheme of distribution rooms is proposed.

In order to achieve the above purposes, technical solutions of the present disclosure are specifically described as follows.

An apparatus for parameter comprehensive monitoring and troubleshooting of power transformation and distribution is provided, including a data acquisition unit, an on-site CPU, a main CPU, an operation and maintenance control center and a UPS. Multiple data acquisition units are arranged, and multiple data acquisition units are respectively arranged in multiple power distribution rooms and are respectively used to collect environmental data of the corresponding power distribution rooms. The multiple data acquisition units are respectively connected with the on-site CPUs for receiving the environmental data collected by the corresponding data acquisition unit by signal. Each of the on-site CPUs is connected with the main CPU for receiving the environmental data of the corresponding distribution room sent by multiple of on-site CPUs and giving an alarm according to an abnormal state information in the environmental data of the distribution room. The main CPU is connected with the operation and maintenance control center for receiving and displaying data information by signal. Each of the on-site CPUs is electrically connected with the UPS by wire. Each of the on-site CPUs is electrically connected with an energy storage breaking mechanism by wire.

Preferably, the data acquisition unit includes an image acquisition module and multiple fiber Bragg grating sensor nodes, and the fiber Bragg grating sensor node includes at least one of the following sensors:
  an ambient temperature sensor for monitoring an ambient temperature of the power distribution room;
  an in-cabinet temperature sensor for monitoring an internal temperature of a distribution cabinet;
  an in-cabinet humidity sensor for monitoring an internal humidity of the distribution cabinet;
  a gas sensor for monitoring a concentration of discharge gas in the distribution room;
  a water level sensor for monitoring a water level depth of a cable channel in the distribution room; and
  a resistance sensor for collecting a resistance signal of power distribution equipment.

Preferably, the on-site CPUs are connected with the main CPU and the operation and maintenance control center by means of Internet communication by signal.

Preferably, the on-site CPUs are connected with the main CPU and the operation and maintenance control center by means of Internet of Things communication by signal.

Preferably, the energy storage breaking mechanism includes at least one of the following equipment:
- a refrigeration equipment and ventilation equipment for cooling the environment of the power distribution room;
- an exhaust equipment for cooling the interior of the distribution cabinet;
- a heating wire and exhaust equipment for dehumidification inside the distribution cabinet;
- a drainage pump for draining cable channels in the power distribution room; and
- an isolation equipment for treating the leaked discharge gas in the power distribution room.

A method for parameter comprehensive monitoring and troubleshooting of power transformation and distribution is provided, including the following steps. Each on-site CPU compares the relevant state values of equipment line collected by a data acquisition unit with a threshold set by fiber Bragg grating sensor nodes and sums up to a main CPU. The main CPU stores and display the relevant state values through a display screen. The node represents each distribution point. A link represents a data transmission path. An attached table displays all state parameters. A working state of the distribution equipment is determined according to a color of the node and the link, including the following steps.

When both the node and the links display green, it is determined that each distribution equipment in the distribution room is in normal working state, and all state parameters are displayed dynamically in time steps in a form of table.

When at least one of the node and the link turns red, it is determined that at least one distribution equipment in the distribution room is working in a dangerous state, the main CPU starts a dispatching function, and the on-site CPU is required to take fault autonomous removal measures through instructions, which including the following steps in turn.

S1: the on-site CPU determines whether the corresponding distribution room is powered off and disconnected, and a process according to a first preset rule is performed if the distribution room has power, Internet of Things and Internet.

S2: the on-site CPU determines whether the corresponding distribution room is powered off and disconnected, and a process according to a second preset rule is performed if the distribution room has power, Internet of Things and no Internet.

S3: the on-site CPU determines whether the corresponding distribution room is powered off and disconnected, and a process according to a third preset rule is performed if the distribution room has no power, no Internet of Things and no Internet.

Preferably, the first preset rule includes the following steps.

It is determined whether the on-site CPU sends an alarm signal through the Internet and requests to execute a command to the operation and maintenance control center within a set time is successful. If the request is successful, the personnel of the operation and maintenance control center check a transmitted fault content, open an on-site image acquisition equipment and observe the on-site situation. An optimal scheme is formulated and a fault point is cut off to eliminate a potential fault.

If the request fails and there is a safe power supply from a standby line, the on-site CPU sends instructions to the main CPU through the Internet. The main CPU dispatches an available equipment line for power supply. An action of the power distribution equipment is controlled through secondary circuit. If there is no safe power supply from a standby line, the on-site CPU sends instructions to the energy storage breaking mechanism directly. The energy storage breaking mechanism disconnects the fault point to eliminate the potential fault.

Preferably, the second preset rule includes the following steps.

It is determined whether the Internet and an on-site LAN are disconnected. The on-site CPU commands relevant institutions to operate offline through a set program to cut off the fault point and eliminate the potential fault if the Internet is disconnected and the on-site LAN works normally.

The faulty equipment is cut off immediately and unconditionally if the Internet and on-site LAN are disconnected to eliminate the potential fault, and the information is transmitted to the operation and maintenance control center through the Internet of Things.

Preferably, the third preset rule includes the following steps.

It is determined whether the power can be supplied by the UPS, and a process according to the second preset rule is performed if the power can be supplied by the UPS.

If the power cannot be supplied by the UPS, the on-site CPU x in the distribution room x sends instructions to the main CPU using its own power supply. The main CPU, sends load instructions to the on-site CPU x through a transmission channel. The energy storage breaking mechanism disconnects the fault point. After confirmation, the main CPU sends dispatching instructions to the on-site CPU n in the distribution room n through another transmission channel. The distribution room n supplies power resources to the distribution room x through power cables. And the information is recorded at the same time.

Compared with the prior art, the disclosure provides an apparatus for parameter comprehensive monitoring and troubleshooting of power transformation and distribution, which has the following beneficial effects.

1. The disclosure transmits the basic data collected by the data acquisition unit through the Internet of Things and the Internet, and carries out data summary and intelligent analysis. When a dangerous situation occurs, the main CPU starts the dispatching function according to the dangerous situation process, and requires the on-site CPU to take fault autonomous removal measures in time through instructions, so as to enhance the stability and reliability.

2. The disclosure adopts the fiber Bragg grating sensor nodes to quickly collect and upload data in real time, and predicts the development stage of potential faults according to the temperature time change curve. Before the accident, the circuit breaker can be tripped independently to block the dangerous situation in advance, so as to further enhance the stability and reliability. It also has the advantages of wide measurement range, good integration and no electromagnetic interference.

3. The disclosure installs an on-site CPU in each power distribution room, and each on-site CPU is controlled by the same main CPU, and adopts the mode of one-control-many to realize joint management. When a dangerous situation occurs, the main CPU starts the power resource dispatching function, which solves the problem of power resource sharing between distribution rooms.

The disclosure establishes a local area network through the mode of one-control-many, which is convenient for summarizing the collected data and realizing joint management. Through the intelligent analysis of the data to determine the dangerous situation process, active protection measures can be adopted in time at special times or fault stages, which enhances the stability and reliability. It also has the advantages of high integration and no electromagnetic interference.

DETAILED DESCRIPTION OF THE EMBODIMENTS

The technical scheme in the embodiments of the disclosure will be clearly and completely described below in combination with the attached drawings in the embodiments of the disclosure. Obviously, the described embodiments are only part of the embodiments of the disclosure, not all of the embodiments.

In the description of the disclosure, it should be understood that the azimuth or position relationship indicated by the terms "up", "down", "front", "back", "left", "right", "top", "bottom", "inside", "outside" is based on the azimuth or position relationship shown in the attached drawings. It is only for the convenience of describing the disclosure and simplifying the description, rather than indicating or implying that the device or element must have a specific orientation, be constructed and operated in a specific orientation, so it cannot be understood as a limitation of the disclosure.

Embodiment 1

Figure 1:
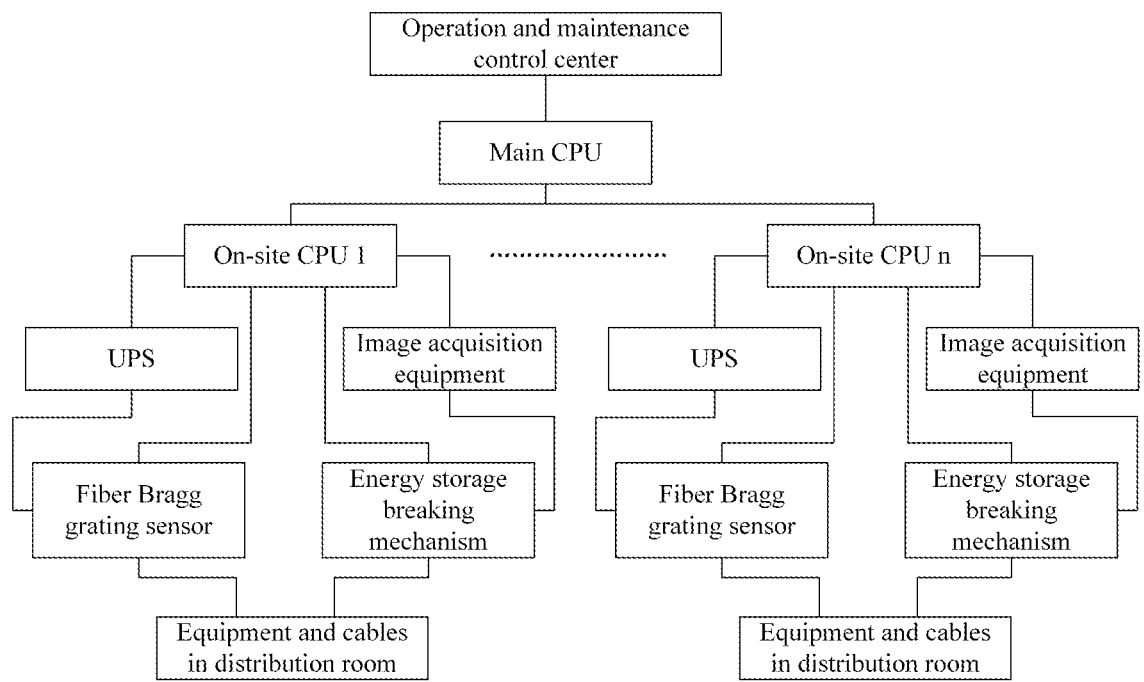
FIG. 1 is a structural block diagram of an apparatus for parameter comprehensive monitoring and troubleshooting of power transformation and distribution provided in the disclosure.
Figure 2:
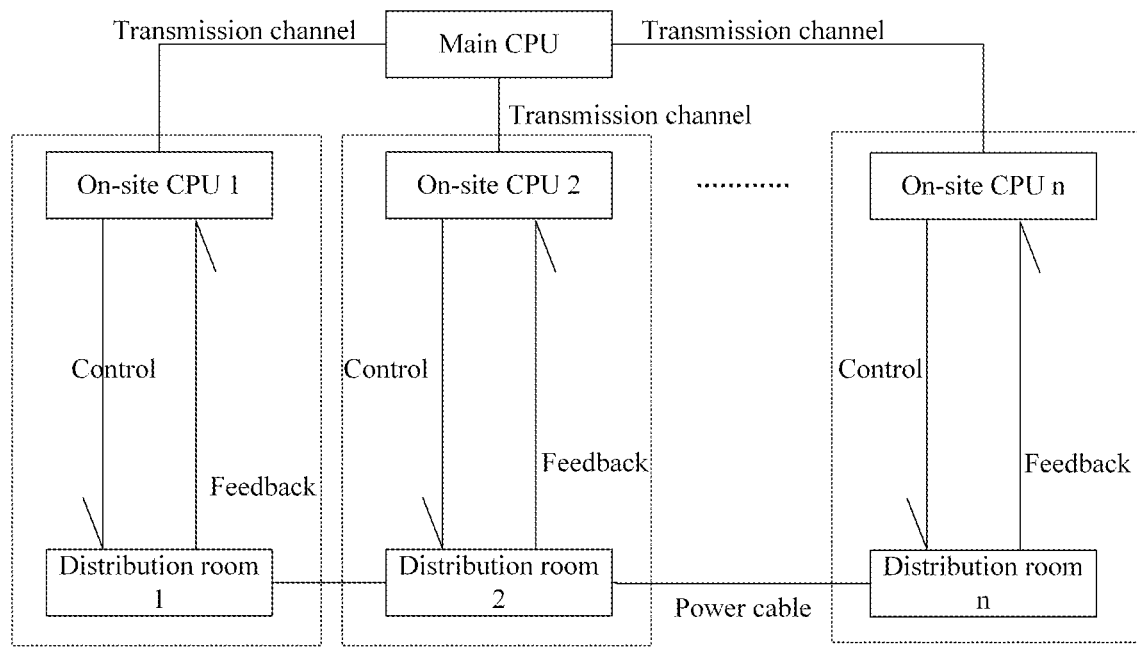
FIG. 2 is the connection diagram between the main CPU and multiple on-site CPUs in an apparatus and method for parameter comprehensive monitoring and troubleshooting of power transformation and distribution provided in the disclosure.

Referring to FIG. 1 and FIG. 2, an apparatus for parameter comprehensive monitoring and troubleshooting of power transformation and distribution includes a data acquisition unit, an on-site CPU, a main CPU, an operation and maintenance control center and a UPS. Multiple data acquisition units are arranged, and multiple data acquisition units are respectively arranged in multiple power distribution rooms and are respectively used to collect environmental data of the corresponding power distribution rooms. The multiple data acquisition units are respectively connected with the on-site CPUs for receiving the environmental data collected by the corresponding data acquisition unit by signal. Each of the on-site CPUs is connected with the main CPU for receiving the environmental data of the corresponding distribution room sent by multiple of on-site CPUs and giving an alarm according to an abnormal state information in the environmental data of the distribution room. The main CPU is connected with the operation and maintenance control center for receiving and displaying data information by signal. Each of the on-site CPUs is electrically connected with the UPS by wire. Each of the on-site CPUs is electrically connected with an energy storage breaking mechanism by wire.

The data acquisition unit includes an image acquisition module and multiple fiber Bragg grating sensor nodes, and the fiber Bragg grating sensor node includes at least one of the following sensors: an ambient temperature sensor for monitoring an ambient temperature of the power distribution room, an in-cabinet temperature sensor for monitoring an internal temperature of a distribution cabinet, an in-cabinet humidity sensor for monitoring an internal humidity of the distribution cabinet, a gas sensor for monitoring a concentration of discharge gas in the distribution room, a water level sensor for monitoring a water level depth of a cable channel in the distribution room; and a resistance sensor for collecting a resistance signal of power distribution equipment. In the window period from danger to accident, timely and rapid data comparison is particularly important. During the sharp change of parameters, the real-time data sensed by fiber Bragg grating sensor nodes tend to be more real. Therefore, the fiber Bragg grating sensor nodes can collect and upload data in real time and quickly, and the development stage of hidden dangers can be predicted according to the temperature time change curve. The circuit breaker is automatically tripped before an accident occurs, which greatly inhibits the further deterioration of the dangerous situation.

The energy storage breaking mechanism includes at least one of the following equipment: a refrigeration equipment and ventilation equipment for cooling the environment of the power distribution room, an exhaust equipment for cooling the interior of the distribution cabinet, a heating wire and exhaust equipment for dehumidification inside the distribution cabinet, a drainage pump for draining cable channels in the power distribution room, and an isolation equipment for treating the leaked discharge gas in the power distribution room, which is convenient to take active actions at special moments or fault stages.

Embodiment 2

Figure 3:
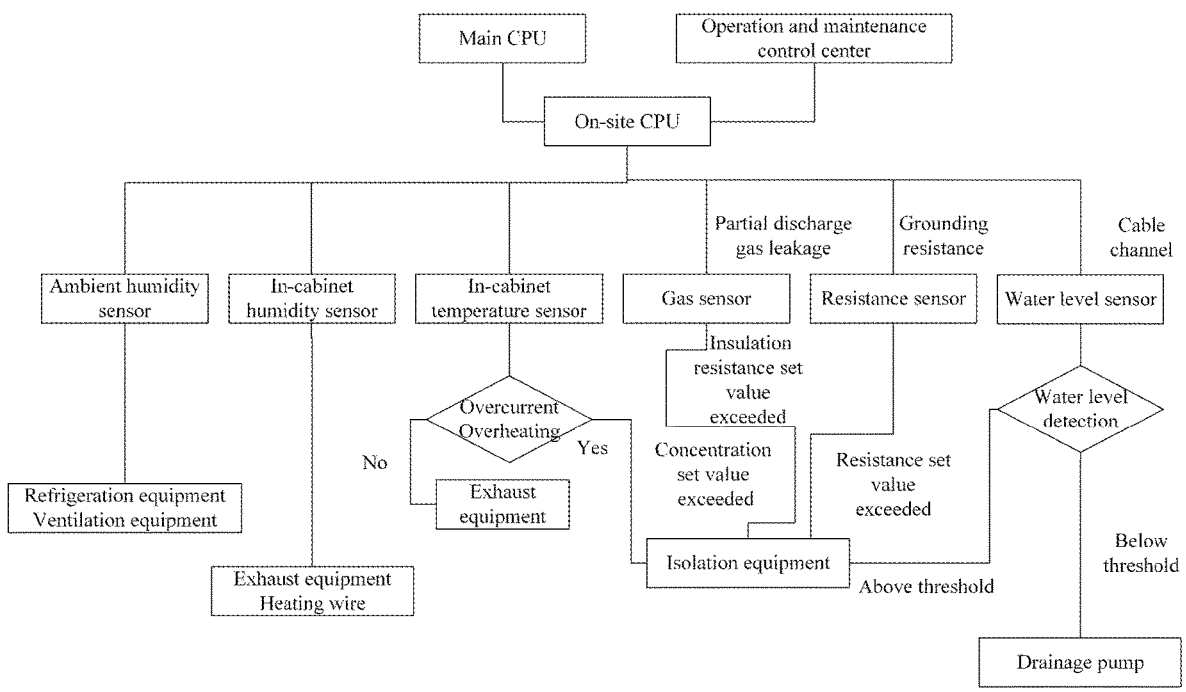
FIG. 3 is a structural block diagram of a method for parameter comprehensive monitoring and troubleshooting of power transformation and distribution provided in the disclosure.

As shown in FIG. 3, the present embodiment provides a method for parameter comprehensive monitoring and troubleshooting of power transformation and distribution is provided, including the following steps. Each on-site CPU compares the relevant state values of equipment line collected by a data acquisition unit with a threshold set by fiber Bragg grating sensor nodes and sums up to a main CPU. The main CPU stores and display the relevant state values through a display screen. The node represents each distribution point. A link represents a data transmission path. An attached table displays all state parameters. A working state of the distribution equipment is determined according to a color of the node and the link, including the following steps.

When both the node and the links display green, it is determined that each distribution equipment in the distribution room is in normal working state, and all state parameters are displayed dynamically in time steps in a form of table.

When at least one of the node and the link turns red, it is determined that at least one distribution equipment in the distribution room is working in a dangerous state, the main CPU starts a dispatching function, and the on-site CPU is required to take fault autonomous removal measures through instructions, which including the following steps in turn.

S1: the on-site CPU determines whether the corresponding distribution room is powered off and disconnected, and a process according to a first preset rule is performed if the distribution room has power, Internet of Things and Internet. The first preset rule includes the following steps.

It is determined whether the on-site CPU sends an alarm signal through the Internet and requests to execute a command to the operation and maintenance control center within a set time is successful. If the request is successful, the personnel of the operation and maintenance control center check a transmitted fault content, open an on-site image acquisition equipment and observe the on-site situation. An optimal scheme is formulated and a fault point is cut off to eliminate a potential fault.

If the request fails and there is a safe power supply from a standby line, the on-site CPU sends instructions to the main CPU through the Internet. The main CPU dispatches an available equipment line for power supply. An action of the power distribution equipment is controlled through secondary circuit. If there is no safe power supply from a standby line, the on-site CPU sends instructions to the energy storage breaking mechanism directly. The energy storage breaking mechanism disconnects the fault point to eliminate the potential fault.

S2: the on-site CPU determines whether the corresponding distribution room is powered off and disconnected, and a process according to a second preset rule is performed if the distribution room has power, Internet of Things and no Internet. The second preset rule includes the following steps.

It is determined whether the Internet and an on-site LAN are disconnected. The on-site CPU commands relevant institutions to operate offline through a set program to cut off the fault point and eliminate the potential fault if the Internet is disconnected and the on-site LAN works normally.

The faulty equipment is cut off immediately and unconditionally if the Internet and on-site LAN are disconnected to eliminate the potential fault, and the information is transmitted to the operation and maintenance control center through the Internet of Things.

S3: the on-site CPU determines whether the corresponding distribution room is powered off and disconnected, and a process according to a third preset rule is performed if the distribution room has no power, no Internet of Things and no Internet. The third preset rule includes the following steps.

It is determined whether the power can be supplied by the UPS, and a process according to the second preset rule is performed if the power can be supplied by the UPS.

If the power cannot be supplied by the UPS, the on-site CPU x in the distribution room x sends instructions to the main CPU using its own power supply. The main CPU, sends load instructions to the on-site CPU x through a transmission channel. The energy storage breaking mechanism disconnects the fault point. After confirmation, the main CPU sends dispatching instructions to the on-site CPU n in the distribution room n through another transmission channel. The distribution room n supplies power resources to the distribution room x through power cables. And the information is recorded at the same time.

In this embodiment, basic data is transmitted through the Internet of Things or the Internet. The priority scheme is to assist the personnel of the operation and maintenance control center to carry out on-site diagnosis in real time through the Internet and auxiliary image acquisition equipment. The personnel of the operation and maintenance control center determine the scheme according to the on-site conditions and feedback parameters to achieve the optimal treatment. In case of request failure, no response or response timeout, the suboptimal scheme is to cut off the fault point and use other safety measures, main CPU dispatching and other methods to supply power. The minimum guarantee scheme is to cut off the fault point directly and wait for rescue.

The disclosure establishes a local area network through the mode of one-control-many, which is convenient for summarizing the collected data and realizing joint management. Through the intelligent analysis of the data to determine the dangerous situation process, active protection measures can be adopted in time at special times or fault stages, which enhances the stability and reliability. It also has the advantages of high integration and no electromagnetic interference.

The above is only the preferred specific embodiments of the disclosure, but the protection scope of the disclosure is not limited to this. Any technical person familiar with the technical field who makes equivalent replacement or change according to the technical scheme and inventive concept of the disclosure within the technical scope disclosed by the disclosure shall be covered by the protection scope of the disclosure.

What is claimed is:

1. A apparatus for parameter comprehensive monitoring and troubleshooting of power transformation and distribution, comprising a data acquisition unit, an on-site CPU, a main CPU, an operation and maintenance control center and a UPS, wherein a plurality of data acquisition units are arranged, and the plurality of data acquisition units are respectively arranged in a plurality of power distribution rooms and are respectively used to collect environmental data of the corresponding power distribution rooms, the plurality of data acquisition units are respectively connected with the on-site CPUs for receiving the environmental data collected by the corresponding data acquisition unit by signal, each of the on-site CPUs is connected with the main CPU for receiving the environmental data of the corresponding distribution room sent by the plurality of on-site CPUs and giving an alarm according to an abnormal state information in the environmental data of the distribution room, the main CPU is connected with the operation and maintenance control center for receiving and displaying data information by signal, each of the on-site CPUs is electrically connected with the UPS by wire, and each of the on-site CPUs is electrically connected with an energy storage breaking mechanism by wire.

2. The apparatus for parameter comprehensive monitoring and troubleshooting of power transformation and distribution of claim 1, wherein the data acquisition unit comprises an image acquisition module and a plurality of fiber Bragg grating sensor nodes, and the fiber Bragg grating sensor node comprises at least one of the following sensors:
   an ambient temperature sensor for monitoring an ambient temperature of the power distribution room;
   an in-cabinet temperature sensor for monitoring an internal temperature of a distribution cabinet;
   an in-cabinet humidity sensor for monitoring an internal humidity of the distribution cabinet;
   a gas sensor for monitoring a concentration of discharge gas in the distribution room;
   a water level sensor for monitoring a water level depth of a cable channel in the distribution room; and
   a resistance sensor for collecting a resistance signal of power distribution equipment.

3. The apparatus for parameter comprehensive monitoring and troubleshooting of power transformation and distribution of claim 1, wherein the on-site CPUs are connected with the main CPU and the operation and maintenance control center by means of Internet communication by signal.

4. The apparatus for parameter comprehensive monitoring and troubleshooting of power transformation and distribution of claim 1, wherein the on-site CPUs are connected with the main CPU and the operation and maintenance control center by means of Internet of Things communication by signal.

5. The apparatus for parameter comprehensive monitoring and troubleshooting of power transformation and distribution of claim 1, wherein the energy storage breaking mechanism comprises at least one of the following equipment:
   a refrigeration equipment and ventilation equipment for cooling the environment of the power distribution room;
   an exhaust equipment for cooling the interior of the distribution cabinet;
   a heating wire and exhaust equipment for dehumidification inside the distribution cabinet;
   a drainage pump for draining cable channels in the power distribution room; and
   an isolation equipment for treating the leaked discharge gas in the power distribution room.

6. A method for parameter comprehensive monitoring and troubleshooting of power transformation and distribution, comprising: comparing, by each on-site CPU, relevant state values of equipment line collected by a data acquisition unit with a threshold set by fiber Bragg grating sensor nodes; summing, by each on-site CPU, up to a main CPU; storing and displaying, by the main CPU, the relevant state values through a display screen; representing, by the node, each distribution point; representing, by a link, a data transmission path; displaying, by an attached table, all state parameters; determining a working state of the distribution equipment according to a color of the node and the link, comprising:
   when both the node and the links display green, determining that each distribution equipment in the distribution room is in normal working state, and displaying all state parameters dynamically in time steps in a form of table; and
   when at least one of the node and the link turns red, determining that at least one distribution equipment in the distribution room is working in a dangerous state; starting, by the main CPU, a dispatching function; and requiring the on-site CPU to take fault autonomous removal measures through instructions, comprising the following steps in turn:
   S1: determining, by the on-site CPU, whether the corresponding distribution room is powered off and disconnected, and performing a process according to a first preset rule if the distribution room has power, Internet of Things and Internet;
   S2: determining, by the on-site CPU, whether the corresponding distribution room is powered off and disconnected, and performing a process according to a second preset rule if the distribution room has power, Internet of Things and no Internet; and
   S3: determining, by the on-site CPU, whether the corresponding distribution room is powered off and disconnected, and performing a process according to a third preset rule if the distribution room has no power, no Internet of Things and no Internet.

7. The method for parameter comprehensive monitoring and troubleshooting of power transformation and distribution of claim 6, wherein the first preset rule comprises:
   determining whether the on-site CPU sends an alarm signal through the Internet and requests to execute a command to the operation and maintenance control center within a set time is successful; if the request is successful, checking, by the personnel of the operation and maintenance control center, a transmitted fault content; opening an on-site image acquisition equipment; observing the on-site situation; formulating an optimal scheme and cutting off a fault point to eliminate a potential fault; and
   if the request fails and there is a safe power supply from a standby line, sending, by the on-site CPU, instructions to the main CPU through the Internet; dispatching, by the main CPU, an available equipment line for power supply; controlling an action of the power distribution equipment through secondary circuit; if there is no safe power supply from a standby line, sending, by the on-site CPU, instructions to the energy storage breaking mechanism directly; disconnecting, by the energy storage breaking mechanism, the fault point to eliminate the potential fault.

8. The method for parameter comprehensive monitoring and troubleshooting of power transformation and distribution of claim 6, wherein the second preset rule comprises:
   determining whether the Internet and an on-site LAN are disconnected; commanding, by the on-site CPU, relevant institutions to operate offline through a set program to cut off the fault point and eliminate the potential fault if the Internet is disconnected and the on-site LAN works normally;
   cutting off the faulty equipment immediately and unconditionally if the Internet and on-site LAN are disconnected to eliminate the potential fault, and transmitting the information to the operation and maintenance control center through the Internet of Things.

9. The method for parameter comprehensive monitoring and troubleshooting of power transformation and distribution of claim 6, wherein the third preset rule comprises:
   determining whether the power can be supplied by the UPS, and performing a process according to the second preset rule if the power can be supplied by the UPS;
   if the power cannot be supplied by the UPS, sending, by the on-site CPU x in the distribution room x, instructions to the main CPU using its own power supply; sending, by the main CPU, load instructions to the on-site CPU x through a transmission channel; disconnecting, by energy storage breaking mechanism, the fault point; after confirmation, sending, by the main CPU, dispatching instructions to the on-site CPU n in the distribution room n through another transmission channel; supply, by the distribution room n, power resources to the distribution room x through power cables, and recording the information at the same time.

* * * * *